US007320811B2

(12) United States Patent
Doyle et al.

(10) Patent No.: US 7,320,811 B2
(45) Date of Patent: Jan. 22, 2008

(54) METHOD AND SYSTEM FOR PAINT MATCHING AND RE-TOUCHING

(75) Inventors: Kirby Doyle, Vancouver, WA (US); Michael Doyle, Vancouver, WA (US)

(73) Assignee: Newtech Touch-Up Systems, Inc., Vancouver, WA (US)

( * ) Notice: Subject to any disclaimer, the term of this patent is extended or adjusted under 35 U.S.C. 154(b) by 0 days.

(21) Appl. No.: 10/832,721

(22) Filed: Apr. 26, 2004

(65) Prior Publication Data

US 2004/0247781 A1 Dec. 9, 2004

Related U.S. Application Data

(60) Provisional application No. 60/477,371, filed on Jun. 9, 2003.

(51) Int. Cl.
*B32B 43/00* (2006.01)
*B05D 1/38* (2006.01)

(52) U.S. Cl. ...................... 427/140; 427/142; 427/429; 427/271

(58) Field of Classification Search ................ 427/140, 427/142, 256, 258, 261, 265, 299, 327, 402, 427/429
See application file for complete search history.

(56) References Cited

U.S. PATENT DOCUMENTS 1,485,521 A 3/1924 Nikolas
3,960,574 A * 6/1976 Lee ............................... 106/3
3,997,580 A * 12/1976 Morehouse ................. 556/428
4,814,200 A * 3/1989 Propst ........................ 427/142
5,064,688 A 11/1991 Trifon
5,077,086 A 12/1991 Cavill
5,082,692 A * 1/1992 Cavill ........................ 427/142
5,188,666 A * 2/1993 Boccardo ................ 106/194.3
5,730,644 A 3/1998 Pfanstiehl
5,783,254 A 7/1998 Maynard
5,834,054 A * 11/1998 Berry ......................... 427/142
6,020,023 A 2/2000 Keller et al.
6,142,868 A 11/2000 Pfanstiehl
6,302,951 B1 10/2001 Odland et al.

OTHER PUBLICATIONS

Yearick, Bob, Aug. 1, 2002, "Winning the Match", ABRN website.*
Lewis, Richard J., Sr. (2002). Hawley's Condensed Chemical Dictionary (14th Edition). John Wiley & Sons. Definitions of true and colloidal solutions.*
IMAC Paint Chip Repair System Confidential Training Manual, copyright 1999.

* cited by examiner

*Primary Examiner*—William Phillip Fletcher, III
(74) *Attorney, Agent, or Firm*—Kolisch Hartwell, P.C.

(57) ABSTRACT

A system is provided for touching up a chipped and scratched painted surface by applying a solvent solution to the surface, applying a selected touch-up paint, and removing a portion of the applied touch-up paint from the painted surface. The removing step includes applying a wax and solvent mixture (e.g., about 40% wax and about 60% naphtha) and then removing a residue of wax and paint by substantially immediately wiping the painted surface with a cloth. The solvent solution may include naphtha. The touch-up paint may have a tone substantially the same as the tone of the painted surface and is slightly darker than the painted surface. The touch-up paint may be prepared by selecting a first paint having the tone that is most similar within the set to the tone of the painted surface and adjusting the tone with a second paint having a tone that is in between the tone of the first selected touch-up paint and the tone of the painted surface, and adjusting the brightness with a third touch-up paint having a tone that is within a same third portion of the color wheel.

6 Claims, No Drawings

METHOD AND SYSTEM FOR PAINT MATCHING AND RE-TOUCHING

STATEMENT OF RELATED APPLICATION

This application claims priority to U.S. Provisional Patent Application Ser. No. 60/477,371, filed on Jun. 9, 2003, which is incorporated by reference.

BACKGROUND

The present disclosure relates to a method and system for paint matching and re-touching a painted surface, including, e.g., a hood of a car, which has been chipped or scratched. New cars are typically painted over all their exterior surfaces with one or more layers of colored paint and a clear coat applied over the colored paint. Even before a first sale of a new car, the painted surfaces of the car may be chipped or scratched. This typically occurs in the shipping process and in preparing the car for sale, and in a used car, the chipping and scratching occurs in the ordinary operation of the car on roads. The chips and scratches typically extend down into the clear coat and the paint, without reaching the underlying body panel, hood, or bumper. In many instances, a car will receive a large number of such scratches and chips, the most common locations being on the hood and front bumper, but also on any body panel or other painted surface.

The method generally used at present to repair such scratches and chips is to address each chip and scratch individually and apply a paint and/or clear coat to each chip and each scratch. This may be done by airbrushing or by applying the paint through a needle and syringe, or other pumping device. Such operations are time consuming both in preparation and application.

SUMMARY

The present disclosure describes repairing a painted surface of a car having one or more chips or scratches by applying preparation chemicals and paint over the painted surface. The disclosure is augmented by a product manual, filed as part of U.S. Provisional Patent Application Ser. No. 60/477,371, which manual is incorporated by reference.

DETAILED DESCRIPTION OF THE PREFERRED EMBODIMENTS

A new or used car may be identified as having chipping or scratching on a painted surface of the car that is desired to be repaired. The chipping and scratching must first be evaluated to determine whether it extends down to the underlying structure, such as the metal panel making up the hood or body panel. In such case, initial preparations of a known form may be used, prior to applying the method and system of the present disclosure.

In the course of applying the method, the technician will typically observe the painted surface and determine the tone and brightness of the paint applied thereon. Tone is typically understood as being the location of the color with respect to a color wheel, which is commonly understood to represent colors as varying from one to another in the following cycle: red, orange, yellow, green, blue, violet, and back to red again. It will be understood that various other names and divisions for the colors may be used in the color wheel. In such a color wheel, certain colors may be understood to be opposite to one another, e.g., red and green, orange and blue, yellow and violet. Similarly, certain colors can be seen to be in a common portion of the color wheel, e.g., blue and violet are within the same sixth portion of the color wheel, while blue and red are within the same third portion of the color wheel.

Brightness is a measure of the lightness or darkness of the color extending from white, which is viewed as having 100% of the possible brightness, through varying degrees of gray to black, which is viewed as having 0% of the possible brightness. Any color has a brightness varying between the ranges for white and black.

The technician will also locate and determine the extent of the chipping and scratching to gauge whether the touch-up method may be applied as below, or whether additional repairs will be necessary. The method is generally applicable to all standard and metallic paints of any tone or brightness. The method may be adapted for application to pearled paint.

The system according to an embodiment of the present invention includes a set of colored paints, preferably varying in tone and brightness. The tones of the paint preferably vary around the color wheel in small regular gradations. For example, ninety paints may be provided in the set, each having a different tone and/or brightness. Such a set size is generally sufficient for fixing any color of the painted surface, although a larger or smaller number may be provided. Paints are often made with a drier, or a drier is added to promote the drying of the paint after application to a surface. Preferably, however, the paints included in the set substantially lack any drying additive. Typically the paint is selected to have a drying characteristic that allows removal of a residue, including wax and paint, under the environmental and timing conditions, as further described below.

Preferably, the selection and preparation of a touch-up paint results in the touch-up paint's having a tone substantially the same as the tone of the painted surface and a brightness slightly darker than the painted surface. This is preferably accomplished by the technician's selecting from the set of colored paints a first paint having the tone that is most similar within the set to the tone of the painted surface. The technician then determines a difference in tone between the painted surface tone and the tone of the selected touch-up paint. The difference in tone may be expressed in terms of a direction around the color wheel where the painted surface tone is positioned with respect to the tone of the selected touch-up paint. For example, the painted surface could be blue with a slightly red tone, i.e., the painted surface is in the violet and red direction from blue, while the closest paint in the set is blue with a slightly green tone. In such case, the touch-up paint is in the green and yellow direction from blue.

The technician may then adjust the tone of the first selected touch-up paint by selecting, from the set of colored paints, a second touch-up paint having a tone that is in between the tone of the first selected touch-up paint and the tone of the painted surface. In the preceding example, the technician will select a violet paint for the second paint to counteract the green tone of the first selected paint, without muddying the overall color of the paint. The technician may then add the second selected touch-up paint to the first selected touch-up paint. Preferably, this is done by adding the second selected touch-up paint by drops, and iteratively checking the resultant color, comparing it to the painted surface by daubing on a test strip and drying, and repeating as necessary to get the optimum color.

The technician may also, separately, or as part of the tone matching, determine a contrast in brightness between the painted surface brightness and the brightness of the selected touch-up paint. The technician may then adjust the brightness of the first selected touch-up paint by selecting, from the set of colored paints, a third touch-up paint having a tone that is within a same third portion of the color wheel as the tone of the first selected touch-up paint, but that contrasts from the brightness of the first paint in the direction of the brightness of the painted surface. The technician may then add the third selected touch-up paint to the first selected touch-up paint. Preferably, this is done by adding the third selected touch-up paint by drops, and iteratively checking the resultant color for brightness, comparing it to the painted surface by daubing on a test strip and drying, and repeating as necessary to get the optimum color.

The technician may combine the steps of adjusting the tone and adjusting the brightness by selecting a single additional touch-up paint that provides the tone and brightness adjusting of the second and third selected touch-up paints.

To apply the touch-up paint, the technician applies a solution containing a solvent, such as naphtha, to the painted surface. Preferably, the solvent is applied to a first cloth, such as a towel, and then to the painted surface by rubbing the first cloth on the painted surface. The technician may then apply the touch-up paint to the painted surface. Preferably, the selected paint is applied to a second cloth, such as a section of a shop towel. The section may, e.g., have a square area of about 3-inches by about 3-inches, although other sizes and materials may be used. The touch-up paint may then be applied to the painted surface by rubbing the second cloth on the painted surface.

The technician may then remove a portion of the selected, applied paint from the painted surface, preferably by applying a mixture including wax and naphtha, such as a suspension mixture including about 40% wax and about 60% naphtha. The technician preferably applies the mixture to a third cloth, preferably a shop towel folded three ways, and rubs the third cloth on the painted surface.

The technician determines when to begin the removing step based on various environmental and other criteria. For example, in an ambient temperature between about 60° F. and about 100° F., the removing step may begin when the surface is dry to the touch. In an ambient temperature between about 25° F. and about 59° F., the removing step may begin about five minutes after completing the step of applying the paint. Other criteria including humidity, wind, and the type of paint on the painted surface may also be considered.

The technician may then remove a residue, including wax and paint, from the painted surface. Preferably, the technician removes the residue by wiping the painted surface with a fourth cloth, such as a white, terrycloth towel. Preferably, the step of removing the residue begins substantially immediately after the step of removing the portion of the selected paint.

After the preceding steps, the technician may wipe the painted surface with a fifth cloth, such as a micro fiber towel, to achieve a final gloss appearance. The technician may mark a headlight of the car or other structure associated with the painted surface to indicate a completed application of touch-up paint.

It is believed that the disclosure set forth above encompasses multiple distinct inventions with independent utility. While each of these inventions has been disclosed in its preferred form, the specific embodiments thereof, as disclosed and illustrated herein, are not to be considered in a limiting sense as numerous variations are possible. The subject matter of the inventions include all novel and non-obvious combinations and sub-combinations of the various elements, features, functions and/or properties disclosed herein. Where claims recite “a” or “a first” element or equivalent thereof, such claims should be understood to include incorporation of one or more such elements, neither requiring, nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. An improvement to a method for using a paint cloth to apply touch-up paint on a painted surface extending over an expanse, the painted surface having a plurality of surface chips and scratches, the improvement comprising:

prior to applying the touch-up paint using the paint cloth, applying a solution containing a solvent to the painted surface in an area where the chips and scratches are located, wherein the solvent is applied to a first cloth and then to the painted surface by rubbing the first cloth on the painted surface and after applying the touch-up paint using the paint cloth, removing a portion of the selected, applied paint from the painted surface, wherein the removing includes applying a mixture including wax and a solvent to dissolve the portion of the paint and to produce a residue including wax and the dissolved portion of the paint, further wherein applying the mixture includes applying the mixture to a second cloth, wherein the removing step begins about at a time selected based on an ambient temperature, wherein the removing step begins about when the surface is dry to the touch if the ambient temperature is between about 60° F. and about 100° F., and wherein the removing step begins about five minutes after completing the step of applying the paint if the ambient temperature is between about 25° F. and about 59° F.;

removing the residue including wax and the dissolved portion of the paint from the painted surface in the chipped and scratched area, wherein the removing the residue includes wiping the painted surface with a third cloth, wherein the step of removing the residue begins substantially immediately after the step of removing the portion of the selected paint.

2. The method of claim 1 wherein the solvent solution includes naphtha.

3. The method of claim 1 wherein the mixture of wax and solvent is a suspension mixture including about 40% wax and about 60% naphtha.

4. The method of claim 1 further including a step after the removing-residue step, of wiping the painted surface with a fourth cloth.

5. The method of claim 4 wherein the fourth cloth is a micro fiber towel.

6. The method of claim 1 wherein the selected paint substantially lacks any drying additive.

* * * * *